United States Patent
Preston (10) Patent No.: US 10,317,317 B2
(45) Date of Patent: Jun. 11, 2019

(54) HELICAL INSERT INSPECTION DEVICE INCLUDING THREAD-FORMING MEMBER

(71) Applicant: Philip E. Preston, St. Pete Beach, FL (US)

(72) Inventor: Philip E. Preston, St. Pete Beach, FL (US)

(73) Assignee: Littlestar Plastics, LLC, Machesney Park, IL (US)

( * ) Notice: Subject to any disclaimer, the term of this patent is extended or adjusted under 35 U.S.C. 154(b) by 494 days.

(21) Appl. No.: 15/000,874

(22) Filed: Jan. 19, 2016

(65) Prior Publication Data
US 2017/0205315 A1 Jul. 20, 2017

(51) Int. Cl.
| | |
|---|---|
| *F16B 39/20* | (2006.01) |
| *G01M 99/00* | (2011.01) |
| *F16B 5/02* | (2006.01) |
| *F16B 37/12* | (2006.01) |

(52) U.S. Cl.
CPC ........... *G01M 99/00* (2013.01); *F16B 5/0266* (2013.01); *F16B 37/12* (2013.01)

(58) Field of Classification Search
CPC ..... G01M 99/00; G01M 3/005; F16B 5/0266; F16B 37/12; F16B 38/20; G01N 13/00; G01L 9/0013; G05D 13/00; G01P 1/10
See application file for complete search history.

(56) References Cited

U.S. PATENT DOCUMENTS

| | | | | |
|---|---|---|---|---|
| 3,902,399 A | * | 9/1975 | Yotti | F16B 25/00 411/414 |
| 5,333,976 A | * | 8/1994 | Dobbrunz | F16B 5/0233 411/263 |
| 5,375,955 A | * | 12/1994 | Leslie | F16B 1/0071 411/378 |
| 5,777,246 A | * | 7/1998 | Woods | G01B 5/14 209/601 |
| 2001/0014263 A1 | * | 8/2001 | Giannakakos | F16B 37/12 411/432 |
| 2008/0260492 A1 | * | 10/2008 | Townsend | F16B 35/041 411/366.1 |
| 2012/0225408 A1 | * | 9/2012 | Moore | A61C 8/0033 433/174 |

FOREIGN PATENT DOCUMENTS

| | | | |
|---|---|---|---|
| CN | 202707751 U | 1/2013 | |
| JP | 2005-308220 A | 11/2005 | |
| JP | 2005308220 A | * 11/2005 | .............. F16B 37/12 |
| KR | 10-1240990 B1 | 3/2013 | |

\* cited by examiner

*Primary Examiner* — Lisa M Caputo
*Assistant Examiner* — Nigel H Plumb
(74) *Attorney, Agent, or Firm* — Reinhart Boerner Van Deuren P.C.

(57) ABSTRACT

A device for ensuring proper installation of a helical insert is provided. The device includes a head portion, a body portion, and at least one thread-forming member. The body portion has a first section and a second section, and the first section of the body portion depends from the head portion. The second section of the body portion is longer than the length of the helical insert. The at least one thread-forming member is located on the first section of the body portion such that a radial extent defined by the at least one thread-forming member is greater than a radial measure to the inner diametrical surface of the helical insert. A method of using the device is also provided.

20 Claims, 6 Drawing Sheets

HELICAL INSERT INSPECTION DEVICE INCLUDING THREAD-FORMING MEMBER

FIELD OF THE INVENTION

The present invention generally relates to fastening hardware. More particularly, the present invention relates to inspection devices for ensuring proper installation of fastening hardware.

BACKGROUND OF THE INVENTION

Threaded inserts are used in a variety of situations to provide a reliable threaded hole for a fastener. For instance, threaded inserts are used in workpieces that are too soft to provide reliable threads, in workpieces that are too thin to accept threads, or in a workpiece with damaged or stripped threads. The threaded insert can be inserted into an opening in such a workpiece so that the workpiece can still receive a threaded fastener.

Figure 8:
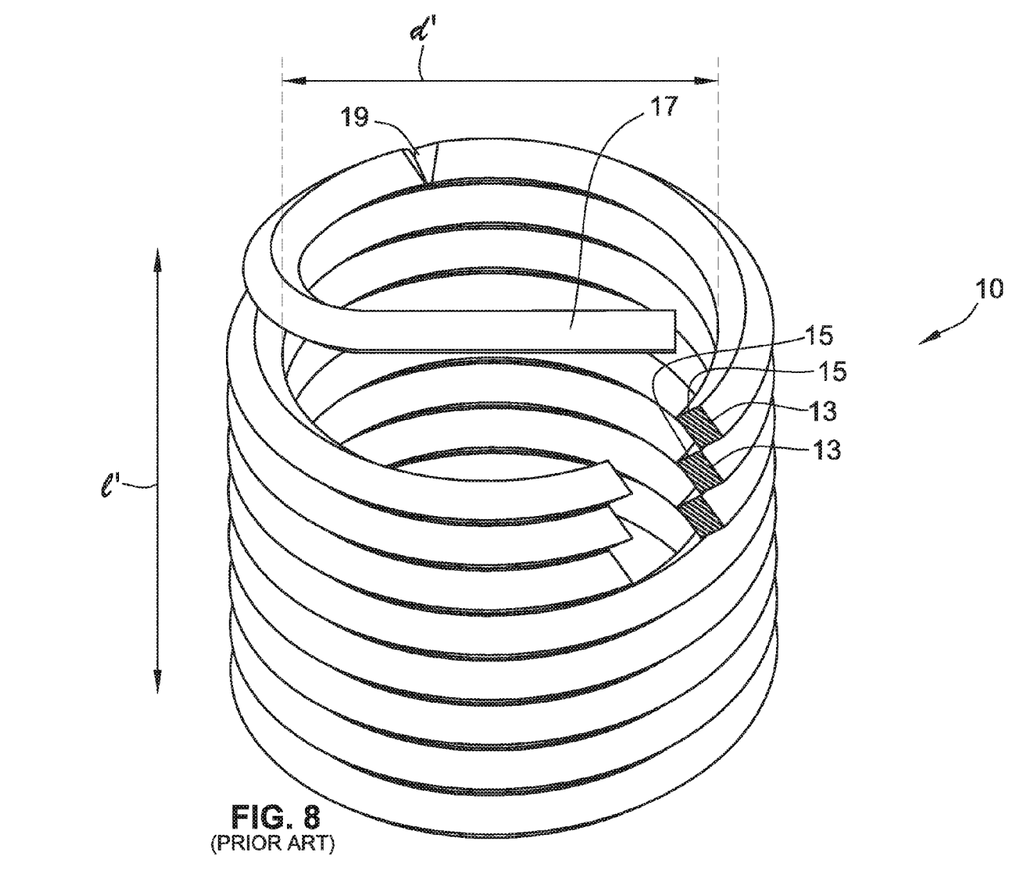
FIG. 8 is a prior art view of a helical insert with a semi-sectional view of the coils of the helical insert.

A particular variety of threaded insert is a helical insert, which can be seen in prior art FIG. 8. As can be seen in the semi-sectional portion of FIG. 8, the helical insert 10 is a coil of wire that typically has a diamond or hexagonal shaped cross-section such that exterior and interior v-shaped edges are created on the insert. In that way, when the coil is compressed, the cross-section allows the exterior set of v-shaped edges 13 to engage the workpiece 14 (not shown). The inner set of v-shaped edges 15 then serves as the threads to receive a threaded fastener. The downstream end of the helical insert 10 features a medially projecting tail 17, referred to as a tang. The tang 17 aids in installation of the helical insert. On the final coil of the helical insert, proximal to the tang 17, is a notch 19. As described below, the notch 19 allows the tang 17 to be removed after installation of the helical insert.

Installation of a helical insert on a manufactured part is typically accomplished in four steps. First, the receiving hole is drilled into the workpiece. Second, threads for receiving the helical insert are tapped into the hole. Third, the helical insert is installed in the workpiece using an installation tool. The installation tool is a cylindrical rod having a diameter of a size to accommodate the helical insert. The end of the installation tool has a stepped surface to engage and drive the tang of the helical insert during installation, and the portion of the installation tool immediately superior to the end has threads to receive the helical insert. In the installation step, the helical insert is wound onto threads at the end of the installation tool until the tang contacts the flat end of the tool. Then, the installation tool is inserted into the hole in the workpiece and rotated in a first direction to feed the helical coil into the hole until the proper depth is achieved. Then the installation tool is rotated in a reverse direction to release the helical insert in the hole. In the final step, another tool having a diameter smaller than the diameter of the helical insert is inserted through the helical insert until it contacts the tang. A hammer is used to strike the tool, which breaks the tang from the helical insert at the location of the notch.

When manufacturing parts that require a helical insert, correctly installing the helical insert into the part is important to assure the quality of the final product. When working on a high volume of parts, a significant number of those parts can fail to contain a helical insert or fail to have the tang removed from the helical insert. Such part defects can cause delays and increased costs for customers, who have to spend time and money to fix these parts or order new ones.

Thus a need exists in the art for a device that a manufacturer can use to check the quality of manufactured parts that include helical inserts.

BRIEF SUMMARY OF THE INVENTION

The present invention has several aspects that may be claimed and stand as patentable independently and individually or in combination with other aspects, including but not limited to the following.

A device for ensuring proper installation of a helical insert is provided. The device includes a head portion, a body portion, and at least one thread-forming member. The body portion has a first section and a second section, and the first section of the body portion depends from the head portion. The second section of the body portion is longer than the length of the helical insert. The at least one thread-forming member is located on the first section of the body portion and defines a radial extent that is greater than a radial measure to the inner diametrical surface of the helical insert. In some embodiments, a flange, having a first surface and a second surface, is disposed between the head portion and the body portion.

In certain embodiments, the head portion has a head shape selected from the group consisting of hexagonal, square, slotted-hexagon, round, pan, cheese, fillister, truss, Phillips, knurled, and socket. In other embodiments, the head portion has a head shape selected from the group consisting of tab, wing-nut, knurled, knobbed, chicken head, and handled.

In certain embodiments, the at least one thread-forming member is a collar encircling the first section of the body portion. In a particular embodiment, the collar has a fluted surface.

In some embodiments of the inspection device, the at least one thread-forming member is a plurality of protrusions. The protrusions can be equidistantly spaced around the first section of the body portion. In a particular embodiment, the plurality of protrusions is three protrusions. In still other embodiments, the plurality of protrusions are triangular prisms.

In embodiments of the device featuring a flange, a gasket may also be provided. The gasket is in physical contact with the flange, and the gasket encircles the at least one thread-forming member. In other embodiments featuring a flange and a gasket, a gap is provided between the at least one thread-forming member and the flange such that the gasket is disposed within the gap.

In some embodiments, indicia is formed on the head portion such that the indicia conveys to a user what size of helical insert with which the inspection device is intended to be used.

In some embodiments, the length of the second section of the body portion is between 1.1 and 1.5 times the length of the helical insert.

In some embodiments, the thread-forming member and the body portion are separate components. In such embodiments, the thread-forming member may be a sleeve.

A method for checking the installation of a helical insert is also provided. The method includes the steps of inserting an inspection device into a hole in a workpiece that is adapted to receive the helical insert and determining whether the inspection device contacts a tang of the helical insert. If the inspection device contacts the tang, then a user removes the tang from the helical insert. The method steps further including inserting the inspection device further into the hole until the at least one thread-forming member contacts the helical insert and rotating the inspection device such that the helical insert cuts grooves into the at least one thread-forming member of the inspection device such that the inspection device is inserted further into the hole.

The method of checking the installation of a helical insert can also be performed with an inspection device that includes a flange disposed between the head portion and the body portion. In such embodiments, the rotating step may be performed until the flange contacts the workpiece. Additionally, in some embodiments of performing the method using a helical insert with a flange, the inspection device can further include a gasket in physical contact with the flange and the rotating step can be performed until the gasket contacts the workpiece and a hermetic seal is created.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION OF THE INVENTION

Figure 1A:
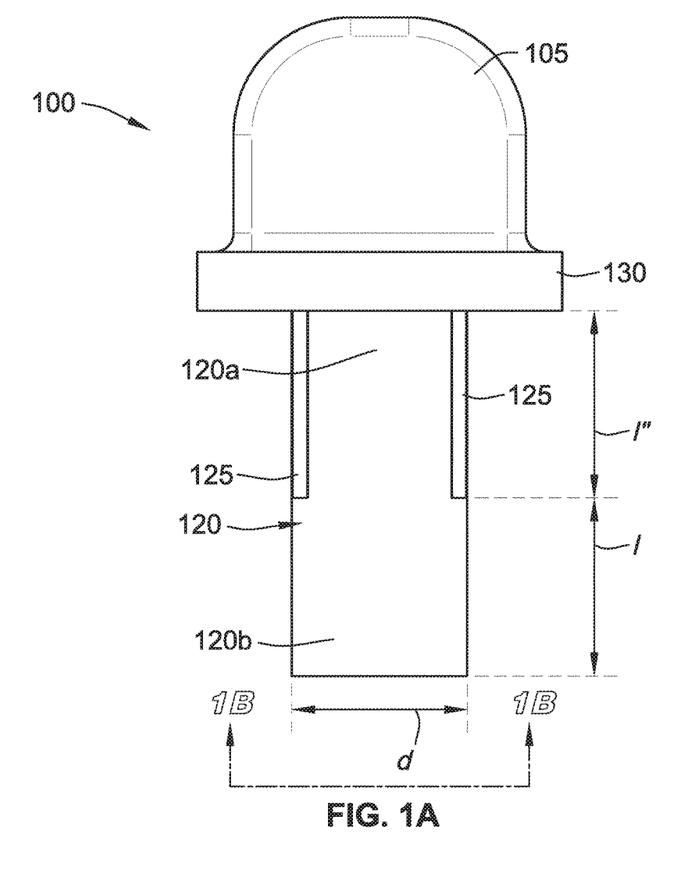
FIG. 1A depicts a side elevation view of a first embodiment of the invented device in accordance with the features of the present invention.

As can be seen in FIG. 1A, the inspection device 100 is generally comprised of a head portion 105 and a body portion 120. Located on the body portion 120 is at least one thread-forming member 125. In the embodiment depicted in FIG. 1A, a flange 130 is disposed between the head portion 105 and the body portion 120. However, in an alternate embodiment of the device, the body portion 120 extends directly from the head portion 105.

Figure 1B:
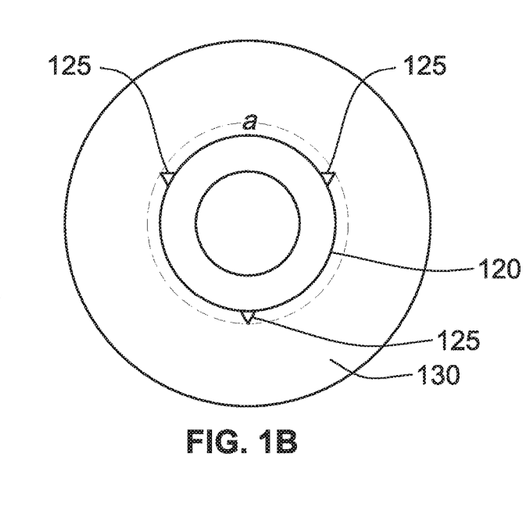
FIG. 1B depicts a plan view of device of FIG. 1A taken from the underside.

Still referring to FIG. 1A, the body portion 120 depends from the flange 130. In this embodiment, both the body portion 120 and the flange 130 are cylindrical in shape; however, different shapes may be used, and the body portion 120 and the flange 130 need not be the same shape. The body portion 120 can be solid or tubular in construction. As shown in FIG. 1B, the body portion is tubular, while in FIG. 2B, the body portion is solid.

Returning to FIG. 1A, the body portion 120 is comprised of a first section 120a and a second section 120b. The first section 120a depends from the flange 130 or the head portion 105, while the second section 120b is inserted into a helical insert 10 (such as shown in FIG. 8). The body portion 120 may be integrally molded with the flange 130 or head portion 105, or the head and body portions may be separate components that are joined through the use of such products as adhesives, fasteners, and pins. The thread-forming members 125 are located on the first section 120a and define the length l" of the first section 120a, which is the distance between the flange 130 (or head portion 105 if the device does not contain a flange) and the distal extent of the thread-forming members 125.

The length l of the second section 120b will depend on the size of the helical insert that is being checked for proper installation. The length l is longer than the length l' of the helical insert. In order to compensate for the depth at which the helical insert is set into the workpiece, preferably length l is 1.1 to 1.5 times the length l' of the helical insert to ensure that the second section 120b will extend to at least the depth of the tang for an installed helical insert. Additionally, the second section 120b preferably has a diameter d that is less than the inner diameter d' of the helical insert but greater than or equal to one-half the inner diameter of the helical insert. This ensures that the second section 120b of the body portion 120 will contact the tang 17 of the helical insert (should one be present) during the checking procedure described below.

Figure 2A:
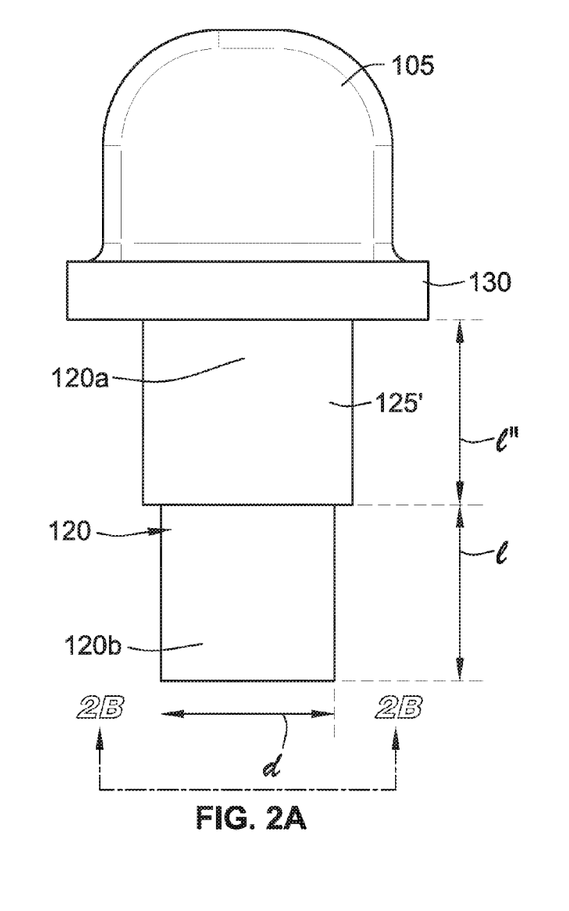
FIG. 2A depicts a side elevation view of a second embodiment of the invented device in accordance with the features of the present invention.
Figure 2B:
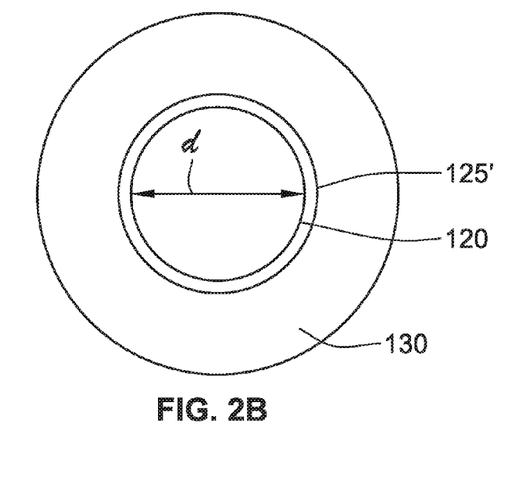
FIG. 2B depicts a plan view of the device of FIG. 2A taken from the underside.

Referring now to FIG. 1B, the thread-forming members 125 extend radially from the surface of the first section 120a of the body portion 120. FIG. 1B depicts three thread-forming members 125 that are equidistantly spaced protrusions around the perimeter of the first section 120a, but as few as two protrusions could be used. As shown in FIG. 2A and 2B, the thread-forming members 125 could be replaced by a single thread-forming collar 125' that is concentric to the first section 120a of the body portion 120. Additionally, the collar 125' could have a fluted surface. Returning to FIG. 1B, the thread-forming members 125 are triangular or wedge-shaped protrusions, but other geometries could also be used, such as cylindrical, rectangular, or trapezoidal. As discussed below, the triangular or wedge-shaped thread-forming members are easier to install, while the collar provides a more secure hold for the inspection device in the helical insert.

Still referring to FIG. 1B, the tips of the thread-forming members 125 define a circumference a. The circumference a is slightly larger than the inner diameter d' of the helical insert 10 but smaller than diameter of the hole in the workpiece 14. Accordingly, the thread-forming members 125 define a radial extent that is greater than a radial measure to the inner diametrical surface of the helical insert 10. In this way, the thread forming-members 125 will engage the interior edges 15 of the helical insert 10. If the thread-forming collar 125' of FIG. 2B is used, then the circumference of the collar 125' is slightly larger than the inner diameter d' of the helical insert 10 but smaller than the diameter of the hole in the workpiece.

As discussed below, the thread-forming members 125 engage the helical insert 10. In order to create a secure engagement, the thread-forming members 125 preferably extend along the first section 120a of the body portion 120 for at least 20% of the length l' of the helical insert 10. Depending the depth of the helical insert 10 in the workpiece 14, the thread-forming members need not run along the entire length l" of the first section 120a. For instance, the thread-forming members 125 do not need to begin at the flange 30 for helical inserts 10 that are not level with the surface of the workpiece 14.

The inspection device 100 is designed to check two aspects of the helical insert installation: (1) whether a helical insert was actually inserted into the workpiece and (2) whether the tang was removed from the helical insert after installation. In some instances, a visual inspection can confirm the first check, but for small pieces or pieces in which the helical insert is installed to a deep depth a visual inspection may not suffice. In order to check these conditions, the inspection device is inserted into the hole in the workpiece 14 intended to receive the helical insert 10. Upon insertion, the user will be able to tell whether the tang has been removed from the device. If it has not, then the second section 120*b* of the body portion 120 will contact the tang 17, and the user will not be able to insert the inspection device 100 into the workpiece 14 any further. As described above, the diameter d of the second section 120*b* is sufficiently large so that the second section 120*b* cannot accidentally be inserted around the tang, thereby providing an inaccurate test result.

If the inspection device 100 does not contact a tang, then either the tang was properly removed or a helical insert was not actually installed. As the user continues to insert the inspection device 100 into the workpiece, the user will be able to confirm whether a helical insert was installed by determining whether the thread-forming members 125 contact the inner edges of the helical insert. As discussed above, the radial extent of the thread-forming members is such that they will contact the inner edges of the helical insert but will not contact the edges of the hole in the workpiece. Thus, if the thread-forming members 125 contact the upstream end of the helical insert, the user knows that a helical insert was installed and the tang has been removed. Conversely, if the thread-forming members 125 do not contact the helical insert, then the user knows that no helical insert was installed in the workpiece.

If the helical insert was installed and if the tang was removed, then upon contacting the upstream end of the helical insert with the thread-forming members the user twists the inspection device in tightening fashion. The device can be used with either left handed or right handed thread directions, and so, the direction of tightening rotation will depend on the handedness of helical insert used. Turning the inspection device 100 while in contact with the helical insert 10 will cause the interior edges 15 of the helical insert 10 to cut grooves into the thread-forming members 125. For this reason, the thread-forming members 125 are preferably made from a material softer than the workpiece. For most metallic workpieces, a variety of plastics, such as low and high density polyethylene, polypropylene, polyvinyl-chloride, polystyrene, and polyethylene terephthalate, are suitable. Rubbers and soft metals, such as copper, tin, lead, aluminum, and alloys thereof are also suitable for certain applications.

Figure 3:
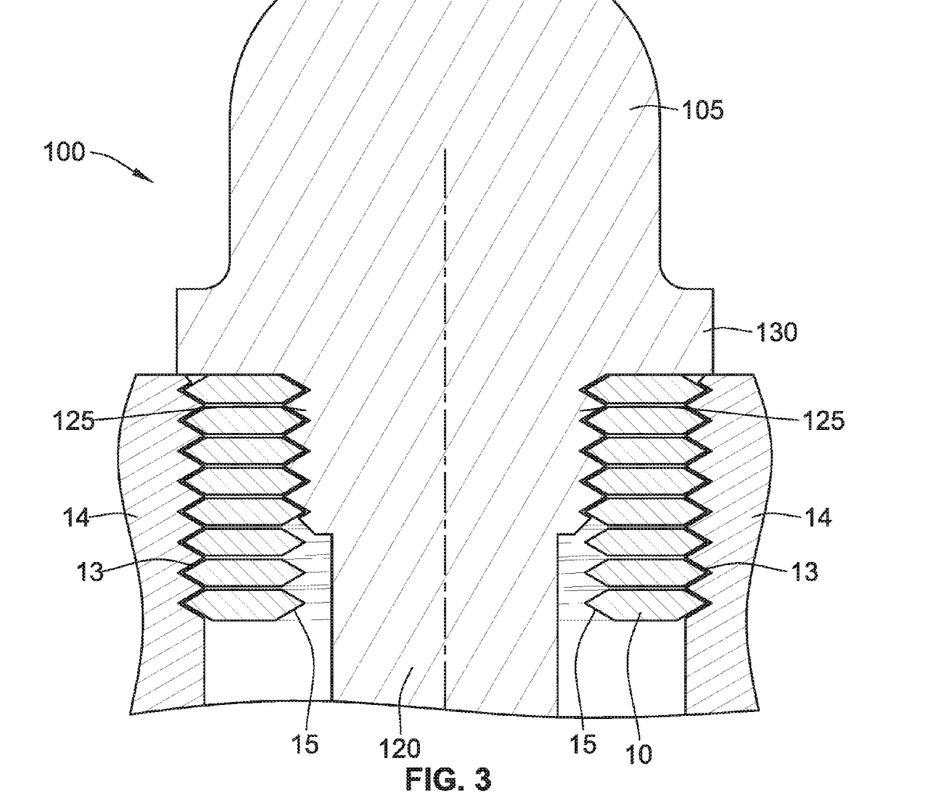
FIG. 3 depicts a section view of the invented device as installed.

As mentioned above, triangular thread-forming members 125 provide the least amount of resistance to turning because they present the least amount of material for the edges 15 to cut through. On the other hand, the collar 125' requires more effort to cut grooves because more material must be cut, but the additional material also advantageously provides a tighter hold for the inner edges of the helical insert. The user tightens the inspection device 100 into the helical insert until the flange 130 contacts the workpiece 14 or until the head portion 105 is level with the workpiece 14. FIG. 3 depicts an inspection device 100 that has been fully tightened into the helical insert 10.

Figure 4:
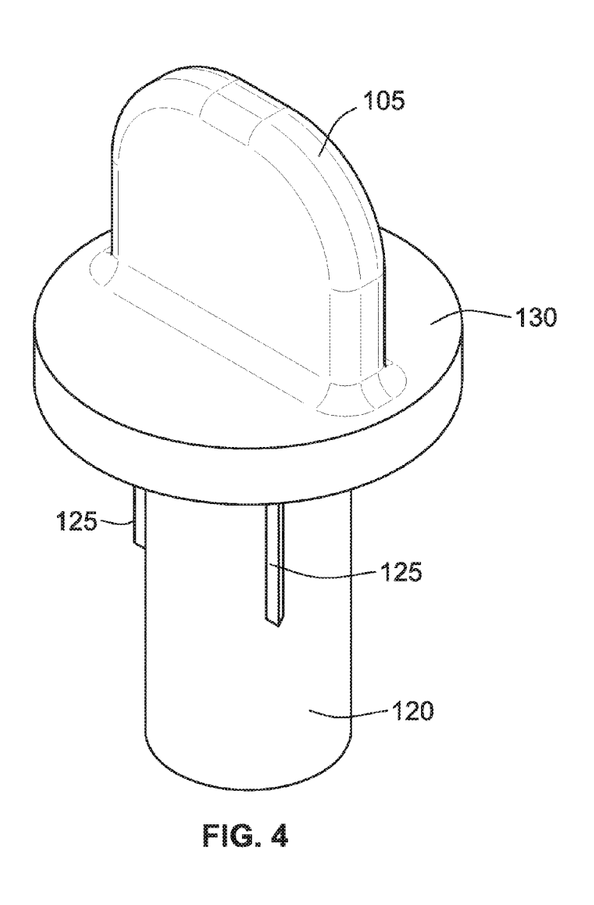
FIG. 4 depicts a perspective view of the first embodiment of the invented device.
Figure 5:
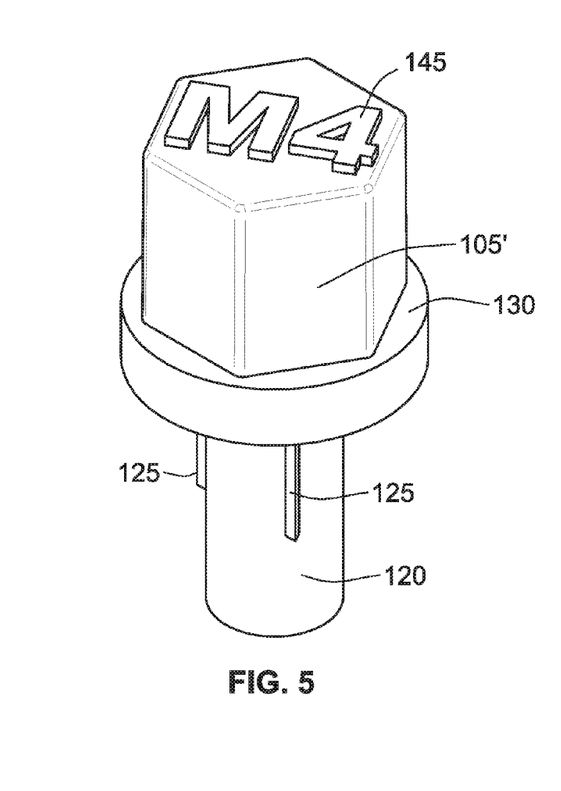
FIG. 5 depicts a perspective view of a third embodiment of the invented device having a hex-head portion.

In the embodiments of the inspection device 100 discussed so far, the head portion 105 as depicted in FIGS. 1-4 can be hand tightened. As depicted in FIG. 4, the head portion 105 is a tab that the user can, for instance, grip between the user's thumb and forefinger. Other hand-tightening head portion embodiments include inter alia wing-nut, knurled, knobbed, chicken head, and handled. However, some inspection devices 100 will be too small or too large for hand-tightening. Thus, as depicted in FIG. 5, an embodiment of the device features a head 105' that engages a tool. FIG. 5 depicts s a hexagonal head portion 105'. Other tool-engaging head shapes include inter alia square, slotted-hexagonal, round, pan, cheese, fillister, truss, Phillips, knurled, and socket.

Figure 6:
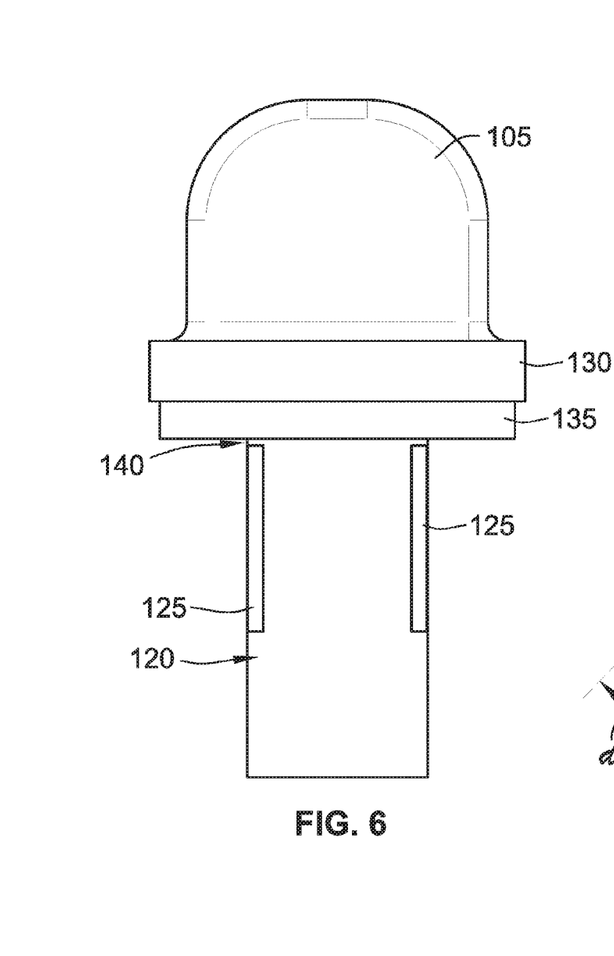
FIG. 6 depicts a side elevation view of a fourth embodiment of the invented device having a gasket.

One advantage of the presently invented inspection device is that it provides a visual indicator that the helical insert has been properly installed in the workpiece. The manufacturer and the customer can readily see the inspection device extending from the workpiece and know that the workpiece is ready for use. Because the inspection device remains in the workpiece until the workpiece is ready for use, the inspection device also advantageously seals the hole from debris and contaminants. In furtherance of this additional advantage, an alternate embodiment of the present invention, depicted in FIG. 6, features a gasket 135, such as an O-ring around or above the thread-forming members 125. In this way, when the inspection device 10 is tightened into the helical insert 10, the gasket 135 will compress between the flange 130 and the workpiece 14, providing a hermetic seal (under standard temperature and pressure) at the entrance of the hole in the workpiece 14. As shown in FIG. 6, a gap 140 may be provided between the flange 130 and the beginning of the thread-forming member 125 to accommodate the gasket 135.

Figure 7:
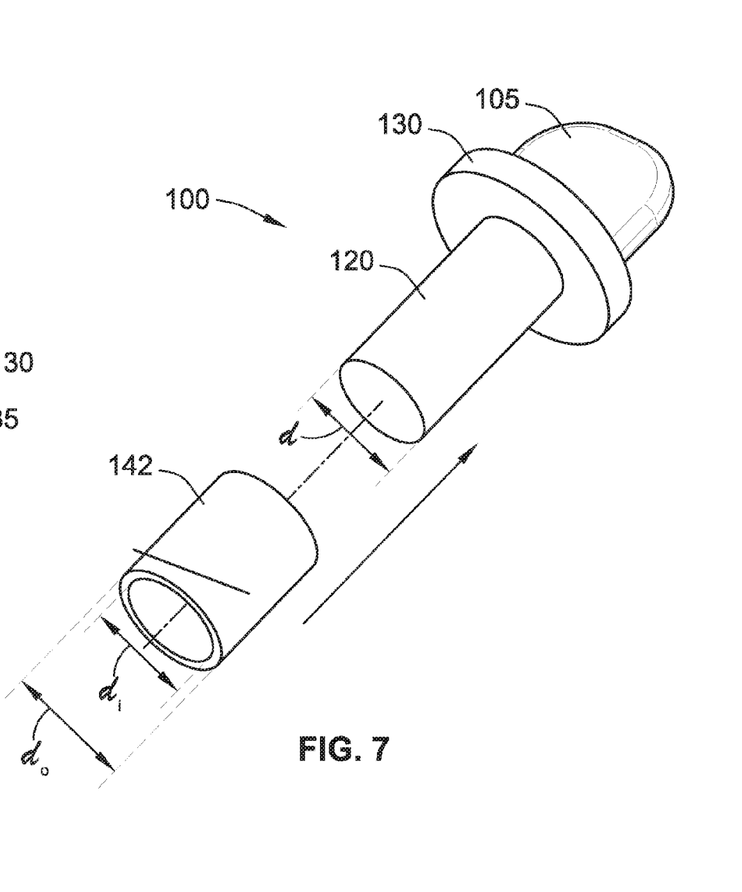
FIG. 7 depicts a fifth embodiment of the invented device in which the thread-forming member and the body portion are separate components.

In another embodiment featuring a gasket, the body portion and the thread forming member are two separate components. As can be seen in FIG. 7, the thread forming member is a sleeve 142 that slides onto the body portion 120. The sleeve 142 is preferable made from a reversibly deformable and elastic material, such as natural gum rubber, latex rubber, and thermoplastic elastomer rubbers. The inner diameter $d_i$ of the sleeve 142 is preferably smaller than the diameter d of the body portion 120 so that the sleeve 142 will have to stretch when placed on the body portion 120, thereby creating a tight seal between the sleeve 142 and body portion 120. The outer diameter $d_o$, like that of the collar 125', should be wider than the inner diameter d' of the helical insert 10 so that the sleeve 142 will engage the inner edges 15 of the helical insert. The sleeve 142 is slid onto the body portion 120 of the device as indicated by the arrows in FIG. 7 prior to use of the inspection device. In this embodiment, the sleeve 142 accomplishes the functions of both the thread-forming member 125 and the gasket 135; however, the sleeve 142 may still be used in conjunction with a gasket 135 if desired by the user.

In still another embodiment of the present invention, the head portion 105 contains indicia designating the size of the helical insert that the inspection device is adapted to engage. FIG. 5 depicts an embodiment featuring indicia 145.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device for ensuring proper installation of a helical insert, said device comprising:
    a head portion;
    a body portion having a first section and a second section, wherein the first section of the body portion depends from the head portion and wherein the second section of the body portion is longer than the length of the helical insert; and
    at least one thread-forming member located on the first section of the body portion wherein a radial extent defined by the at least one thread-forming member is greater than a radial measure to the inner diametrical surface of the helical insert.

2. The device as recited in claim 1, wherein a flange, having a first surface and a second surface, is disposed between the head portion and the body portion.

3. The device of claim 2, further comprising a gasket, wherein the gasket is in physical contact with the flange and the gasket encircles the at least one thread-forming member.

4. The device of claim 2, further comprising a gasket, wherein a gap is provided between the at least one thread-forming member and the flange and wherein the gasket is disposed within the gap.

5. The device as recited in claim 1, wherein the head portion has a head shape selected from the group consisting of hexagonal, square, slotted-hexagon, round, pan, cheese, fillister, truss, Phillips, knurled, and socket.

6. The device as recited in claim 1, wherein the head portion has a head shape selected from the group consisting of tab, wing-nut, knurled, knobbed, chicken head, and handled.

7. The device as recited in claim 1, wherein the at least one thread-forming member is a collar encircling the first section of the body portion.

8. The device as recited in claim 7, wherein the collar has a fluted surface.

9. The device as recited in claim 1, wherein the at least one thread-forming member is a plurality of protrusions.

10. The device as recited in claim 9, wherein the protrusions are equidistantly spaced around the first section of the body portion.

11. The device as recited in claim 9, wherein the plurality of protrusions is three protrusions.

12. The device as recited in claim 9, wherein the plurality of protrusions are triangular prisms.

13. The device of claim 1, wherein indicia is formed on the head portion and wherein the indicia conveys to a user what size of helical insert with which the device is intended to be used.

14. The device of claim 1, wherein the length of the second section of the body portion is between 1.1 and 1.5 times the length of the helical insert.

15. The device of claim 1, wherein the thread-forming member and the body portion are separate components.

16. The device of claim 15, wherein the thread-forming member is a sleeve.

17. A method for checking for the proper installation of a helical insert, said method comprising the steps of:
    inserting an inspection device into a hole in a workpiece that is adapted to receive the helical insert, wherein said inspection device comprises:
        a head portion;
        a body portion having a first section and a second section, wherein the first section of the body portion depends from the head portion and wherein the second section of the body portion is longer than the length of the helical insert; and
        at least one thread-forming member located on the first section of the body portion wherein a radial extent defined by the at least one thread-forming member is greater than a radial measure to the inner diametrical surface of the helical insert;
    determining whether the inspection device contacts a tang of the helical insert, wherein if the inspection device contacts the tang, then a user removes the tang from the helical insert;
    inserting the inspection device further into the hole until the at least one thread-forming member contacts the helical insert; and
    rotating the inspection device such that the helical insert cuts grooves into the at least one thread-forming member and such that the inspection device is inserted further into the hole.

18. The method of claim 17, wherein the inspection device further comprises a flange disposed between the head portion and the body portion.

19. The method of claim 18, wherein the rotating step is performed until the flange contacts the workpiece.

20. The method of claim 18, wherein the inspection device further comprises a gasket in physical contact with the flange and wherein the rotating step is performed until the gasket contacts the workpiece and a hermetic seal is created.

* * * * *